(12) United States Patent
Liu

(10) Patent No.: US 11,886,256 B2
(45) Date of Patent: Jan. 30, 2024

(54) HINGE AND ELECTRONIC DEVICE

(71) Applicant: BEIJING XIAOMI MOBILE SOFTWARE CO., LTD., Beijing (CN)

(72) Inventor: Xinwei Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/576,836

(22) Filed: Jan. 14, 2022

(65) Prior Publication Data

US 2023/0035672 A1    Feb. 2, 2023

(30) Foreign Application Priority Data

Jul. 28, 2021 (CN) .......................... 202110856086.8

(51) Int. Cl.
 *G06F 1/16* (2006.01)

(52) U.S. Cl.
 CPC .......... *G06F 1/1681* (2013.01); *G06F 1/1624* (2013.01); *G06F 1/1652* (2013.01)

(58) Field of Classification Search
 CPC ..... G06F 1/1681; G06F 1/1624; G06F 1/1652
 See application file for complete search history.

(56) References Cited

U.S. PATENT DOCUMENTS

| 2021/0181808 A1 | 6/2021 | Liao et al. |
| 2022/0137676 A1* | 5/2022 | Tian ...................... G06F 1/1652 |
| | | 361/679.27 |

FOREIGN PATENT DOCUMENTS

| CN | 111997991 A | * 11/2020 | ............ F16C 11/045 |
| CN | 111997991 A | 11/2020 | |
| EP | 4008918 A1 | * 6/2022 | .............. F16C 11/04 |
| EP | 4008918 A1 | 6/2022 | |
| WO | 2021036557 A1 | 3/2021 | |
| WO | WO-2021129882 A1 | * 7/2021 | |
| WO | WO-2022093229 A1 | * 5/2022 | |

OTHER PUBLICATIONS

Extended European Search Report of EP Application No. 22151650.3 dated Jul. 7, 2022, (10p).

* cited by examiner

*Primary Examiner* — James Wu
(74) *Attorney, Agent, or Firm* — Arch & Lake LLP

(57) ABSTRACT

A hinge and an electronic device are provided. The hinge includes a hinge body and a bendable assembly. The bendable assembly is in movable connection with one of opposite sides of the hinge body. The bendable assembly includes a first swing arm, a sliding member and a guide member. The first swing arm is in movable connection with the hinge body. A side wall of the sliding member is provided with a chute, and an end, close to the hinge body, of the chute is provided with a gap. The guide member is connected to the first swing arm and is configured to be engaged with or exited from the chute through the gap.

17 Claims, 18 Drawing Sheets

--Prior Art--

--Prior Art--

HINGE AND ELECTRONIC DEVICE

CROSS REFERENCE

This application is based upon and claims priority to Chinese Patent Application No. 202110856086.8, filed on Jul. 28, 2021, the entire content of which is incorporated herein by reference for all purposes.

TECHNICAL FIELD

The present disclosure relates to the field of electronic device technology, and in particular to a hinge and an electronic device.

BACKGROUND

With the development of technology, foldable screens have begun to be widely used in the field of electronic device technology. The current more mature foldable screens are foldable screens having teardrop-shaped cross sections. The hinge of the teardrop-shaped foldable screen can realize folding while avoiding damage to the screen due to excessive folding angles.

The hinge of a folding screen consists of many parts and needs to be assembled in a certain order. The hinges in the relevant technology are cumbersome to assemble, resulting in low production efficiency.

SUMMARY

The present disclosure provides a hinge and an electronic device.

In a first aspect, the present disclosure provides a hinge. The hinge includes a hinge body and a bendable assembly. The bendable assembly is in a movable connection with one side of the hinge body. The bendable assembly includes a first swing arm, a sliding member and a guide member. The first swing arm is in a movable connection with the hinge body. A side wall of the sliding member is provided with a chute, and an end, close to the hinge body, of the chute is provided with a gap. The guide member is connected to the first swing arm and is configured to be engaged with or exited from the chute through the gap.

In a second aspect, the present disclosure also provides an electronic device, which includes two middle frames, a flexible screen, and the hinge as described in the foregoing first aspect. The two middle frames are respectively connected to two bendable assemblies, and the flexible screen is connected to the two middle frames.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

The terms of art or science used herein shall, unless otherwise defined, have the ordinary meaning as understood by persons of ordinary skill in the art to which this disclosure relates. The "first", "second", "third" and similar words used in the description and claims of the present disclosure do not indicate any order, quantity or importance, but are only used to distinguish different components. Similar words such as "a/an" or "one" do not mean a quantity limit, but rather the existence of at least one. Similar terms such as "include" or "contain" are intended to indicate that the element or object appearing before the "include" or "contain" covers or equivalents to the element or object that appears after the "include" or "contain". Similar words such as "connected to" or "connected with" are not limited to physical or mechanical connections, but may include electrical connections, whether direct or indirect. The terms "up", "down", "left", "right", etc. are only used to indicate the relative position relationships, and when the absolute position of the described object changes, the relative position relationship may also change accordingly.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Figure 1:
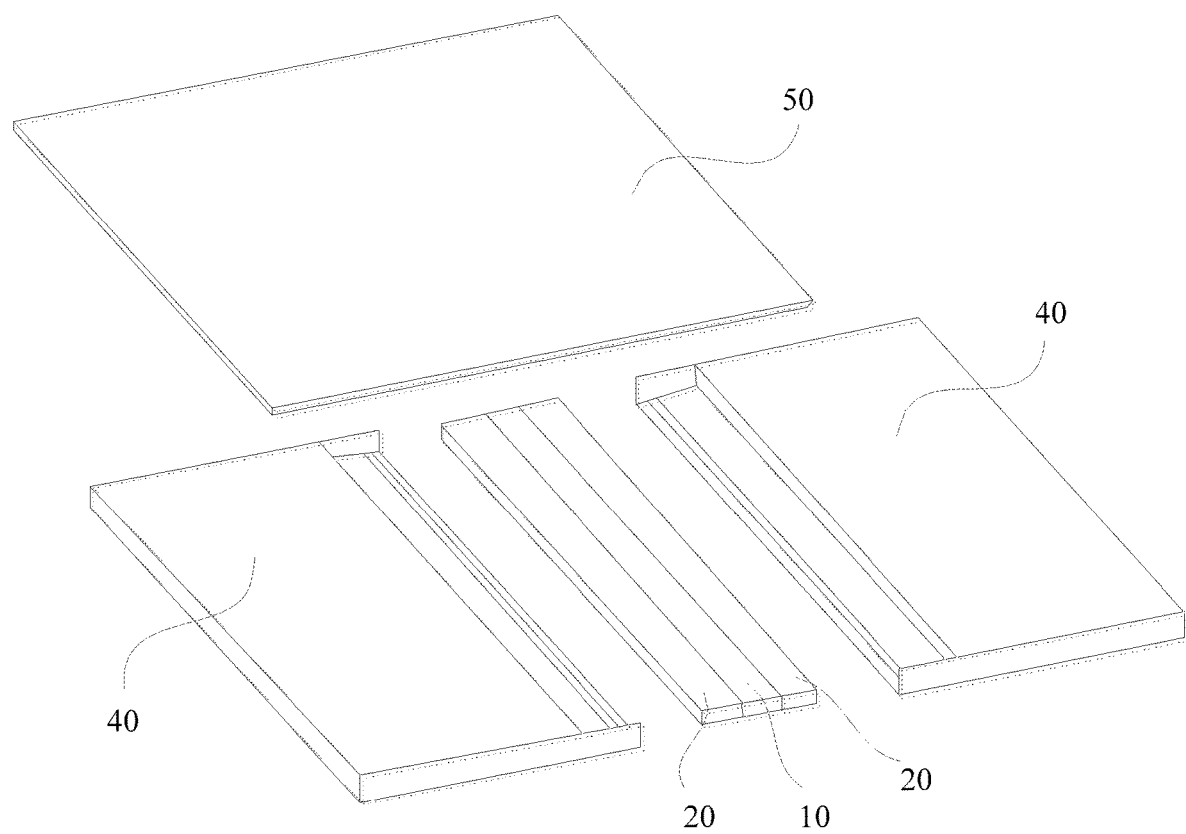
FIG. 1 illustrates a structural schematic diagram of an electronic device in the related art.

FIG. 1 illustrates a structural schematic diagram of an electronic device in the related art. As shown in FIG. 1, the electronic device includes a hinge body 10, two bendable assemblies 20, two middle frames 40, and a flexible screen 50. The two bendable assemblies 20 are disposed on opposite sides of the hinge body 10 and are connected to the hinge body 10. The bendable assemblies 20 may be rotated around the hinge body 10. The two middle frames 40 are connected to the two bendable assemblies 20, respectively. The flexible screen 50 is connected to the two middle frames 40. Since the bendable assemblies 20 are connected to the middle frames 40, the electronic device is folded in such a way that the two middle frames 40 rotate around the hinge body 10 under the action of the bendable assemblies 20 and the flexible screen 50 is bent under the action of the middle frames 40.

Figure 2:
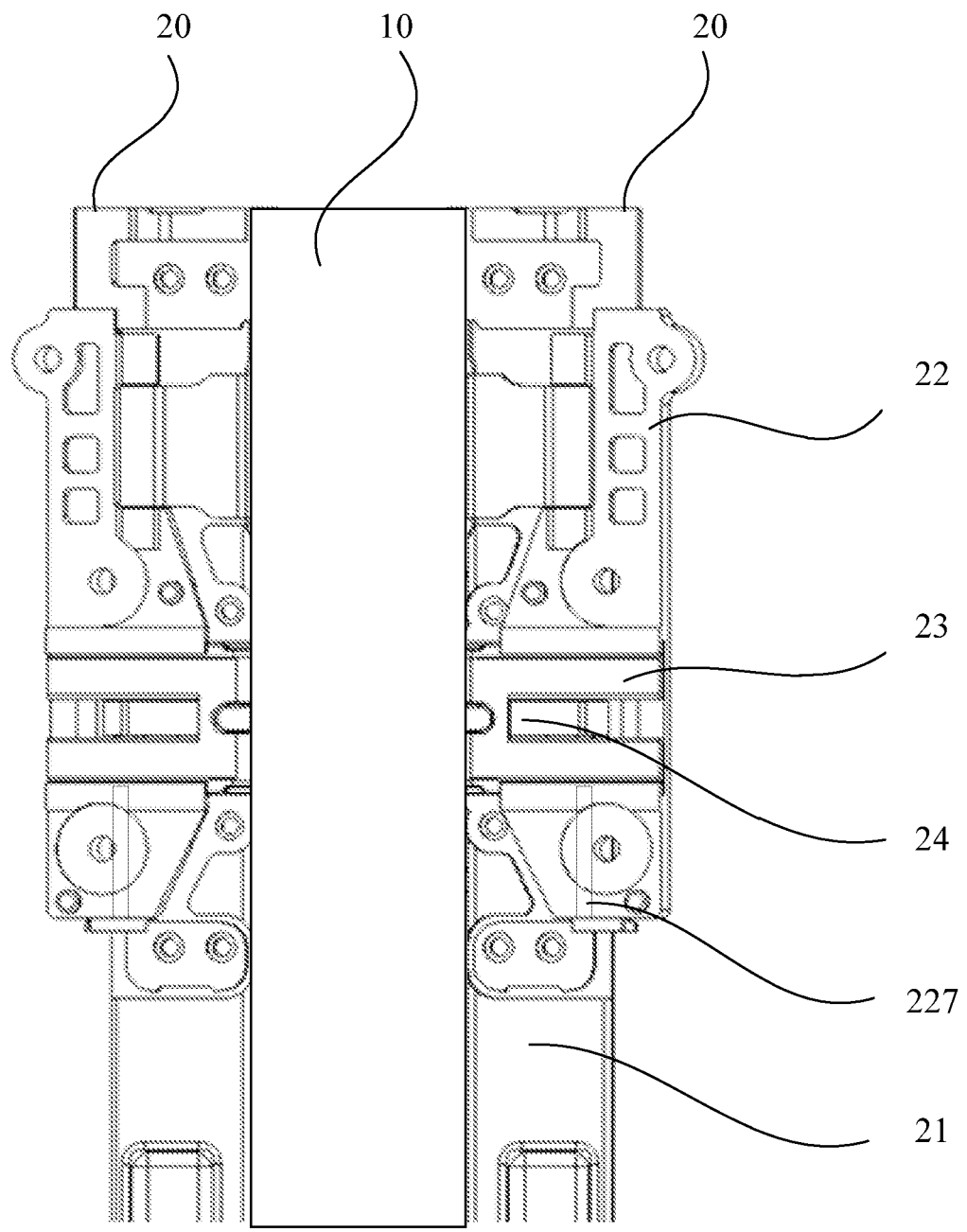
FIG. 2 illustrates a structural schematic diagram of a hinge in the related art.

FIG. 2 illustrates a structural schematic diagram of a hinge in the related art. As shown in FIG. 2, the dotted line indicates a pin hole 227, which is disposed in a middle frame connector 22. The bendable assembly 20 includes a support member 21, the middle frame connector 22, a first swing arm 23, and a sliding member 24. The middle frame connector 22, the first swing arm 23, and the sliding member 24 are disposed on the same surface of the support member 21, and the support member 21 is pivotally connected to the middle frame connector 22. The first swing arm 23 is pivotally connected to the hinge body 10, and the first swing arm 23 is in slip connection with the middle frame connector 22. The first swing arm 23 is in slip connection with the sliding member 24 by a pin. The sliding member 24 has an enclosed chute. When assembling the bendable assembly, the pin needs to be pushed into the chute on the sliding member 24 through the pin hole 227 in the middle frame connector 22, after which the pin is fixedly connected to the first swing arm 23. In this case, it is not only necessary to set the pin hole 227 in the hinge, but also the installation of the pin is more troublesome, which affects the assembly efficiency.

Figure 3:
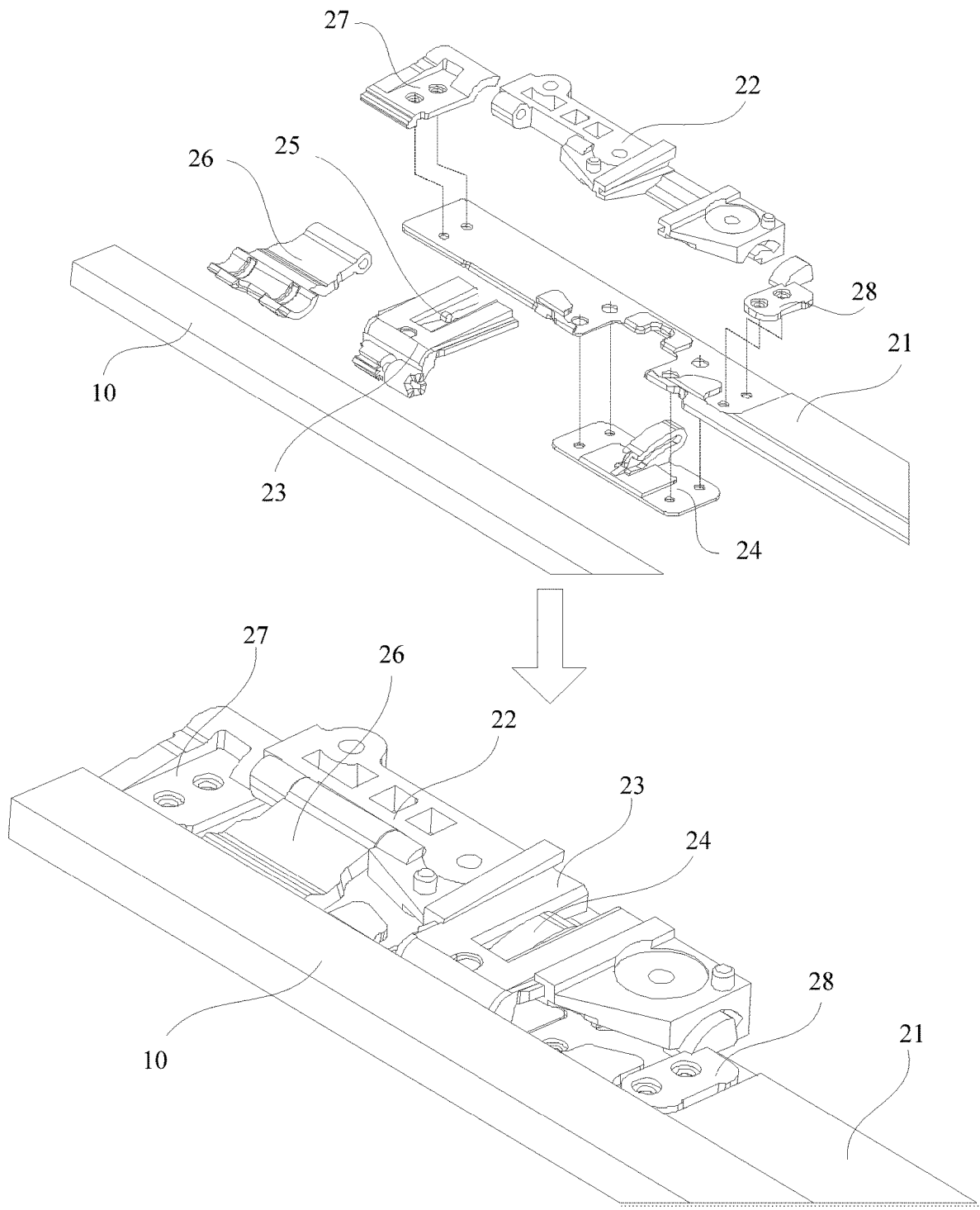
FIG. 3 illustrates a schematic diagram of an assembling process of a hinge provided by one or more examples of the present disclosure.

FIG. 3 illustrates a schematic diagram of an assembling process of a hinge provided by examples of the present disclosure. As shown in FIG. 3, the hinge includes a hinge body 10 and a bendable assembly 20, with the bendable assembly 20 being in movable connection with one of opposite sides of the hinge body 10. FIG. 3 illustrates an example, which only shows one bendable assembly 20 located on one side of the hinge body 10. The bendable assembly 20 includes a first swing arm 23, a sliding member 24, and a guide member. The first swing arm 23 is in movable connection with the hinge body 10.

Figure 4:
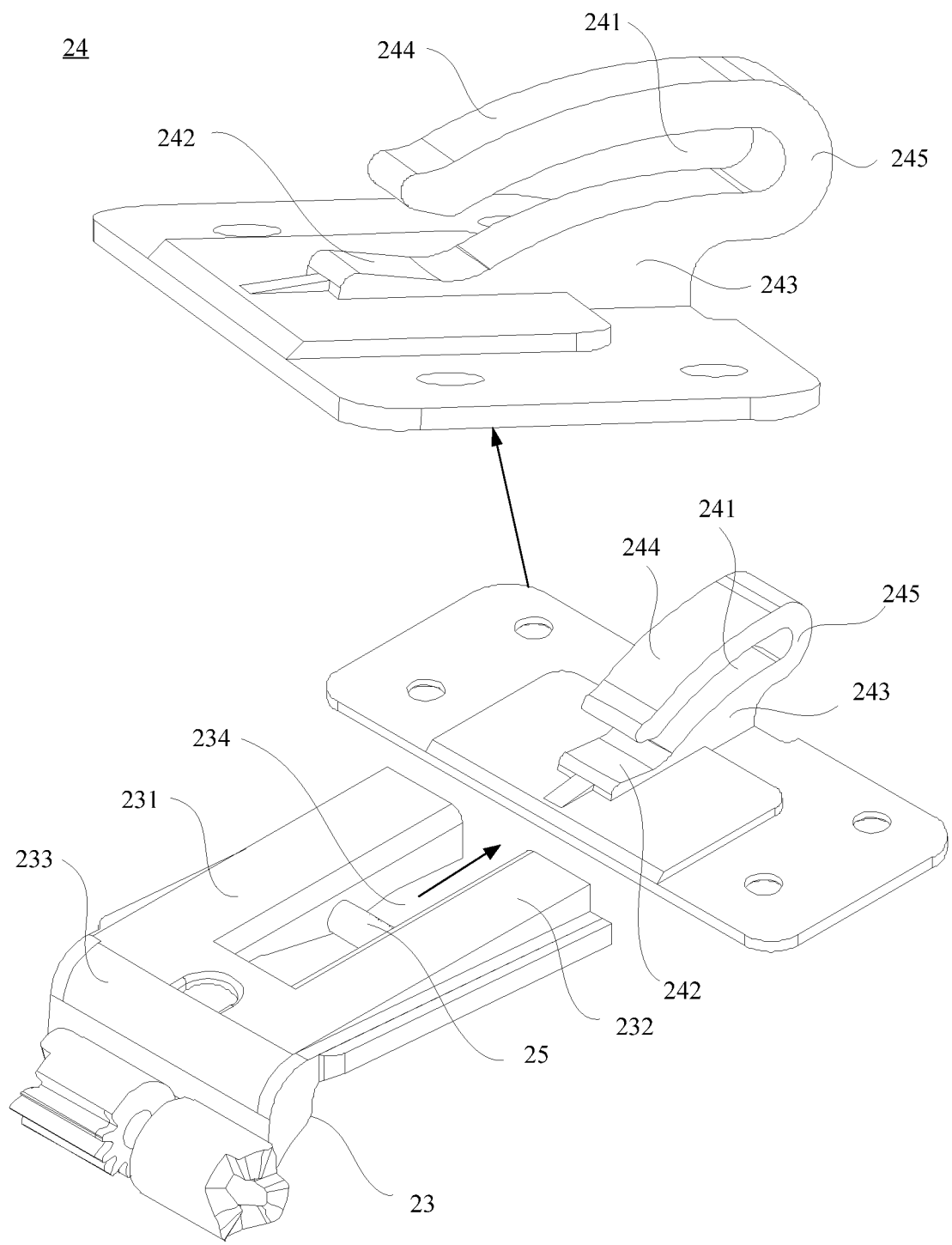
FIG. 4 illustrates a schematic diagram of an assembling process of a first swing arm with a sliding member provided by one or more examples of the present disclosure.

FIG. 4 illustrates a schematic diagram of an assembling process of a first swing arm with a sliding member provided by some examples of the present disclosure. As shown in FIG. 4, a side wall of the sliding member is provided with a chute 241, and an end, close to the hinge body 10, of the chute 241 is provided with a gap 242. The guide member 25 is connected to the first swing arm 23 and is configured to be engaged with or exited from the chute 241 through the gap 242. The guide member 25 may be a pin or a protrusion.

By providing a gap at one end of the chute close to the hinge body, the guide member connected to the first swing arm may be engaged with the chute through the gap during assembly, and may be exited from the chute through the gap during disassembly, which facilitates the assembly of the hinge. Further, there is no need to provide guide hole in the middle frame connector, which is beneficial to improve production efficiency.

As shown in FIG. 3, the bendable assembly 20 further includes a support member 21 and a middle frame connector 22. The sliding member 24 is connected to the support member 21. The middle frame connector 22, the first swing arm 23, the guide member 25 and the sliding member 24 are disposed on the same surface of the support member 21. The middle frame connector 22 is pivotally connected to the support member 21. The first swing arm 23 is in slip connection with the middle frame connector 22 and is pivotally connected to the hinge body 10. When the bendable assembly 20 is rotated around the hinge body 10, the first swing arm 23 is rotated around the hinge body 10 and the middle frame connector 22 slides relative to the first swing arm 23, while the support member 21 is rotated relative to the middle frame connector 22.

As shown in FIG. 4, the chute 241 is in a circular arc shape. When the bendable assembly 20 rotates around the hinge body 10, the middle frame connector 22 slides relative to the first swing arm 23, and the sliding member 24 will also slide relative to the first swing arm 23, at which time the guide member 25 will move along the circular arc trajectory of the chute 241, and the sliding member 24 and the support member 21 will rotate relative to the middle frame connector 22 under the action of the guide member 25.

As shown in FIG. 4, the sliding member 24 includes a mounting portion 243, a limiting portion 244, and a first connecting portion 245. The mounting portion 243 is connected to the support member 21. The limiting portion 244 is located on a side of the mounting portion 243 away from the support member 21. The first connecting portion 245 is located on a side of the mounting portion 243 away from the hinge body 10, and the first connecting portion 245 is connected to the mounting portion 243 and the limiting portion 244, respectively. The mounting portion 243, the limiting portion 244, and the first connecting portion 245 enclose the chute 241.

The chute 241 is enclosed by the mounting portion 243, the limiting portion 244 and the first connecting portion 245 to limit the range of movement of the guide member 25. The mounting portion 243 and the limiting portion 244 are spaced apart from each other and form the gap 242 at the end of the chute 241 close to the hinge body 10, so that the guide member 25 can slide directly from the gap 242 into the space between the mounting portion 243 and the limiting portion 244 when the first swing arm 23 and the sliding member 24 are coupled.

As shown in FIG. 4, the first swing arm 23 includes a first sliding rail 231, a second sliding rail 232, and a rotating part 233. The first sliding rail 231 and the second sliding rail 232 are located on a same side of the rotating part 233, and are respectively connected to the rotating part 233. The rotating part 233 is hinged to the hinge body 10. The first sliding rail 231, the second sliding rail 232 and the rotating part 233 enclose a mounting groove 234. Both the guide member 25 and the sliding member 24 can be located in the mounting groove 234. The mounting groove 234 may be fitted to the sliding member 24 to limit the movement of the sliding member 24 within the mounting groove 234, providing a smoother relative movement of the sliding member 24 to the first swing arm 23.

Two ends of the guide member 25 are respectively connected to the first sliding rail 231 and the second sliding rail 232. Since the sliding member 24 is provided with the gap 242, the guide member 25 may be mounted and fixed to the first swing arm 23 first, and then may be slid into the chute 241 from the gap 242 of the sliding member 24 to achieve a sliding connection between the first swing arm 23 and the sliding member 24.

Figure 5:
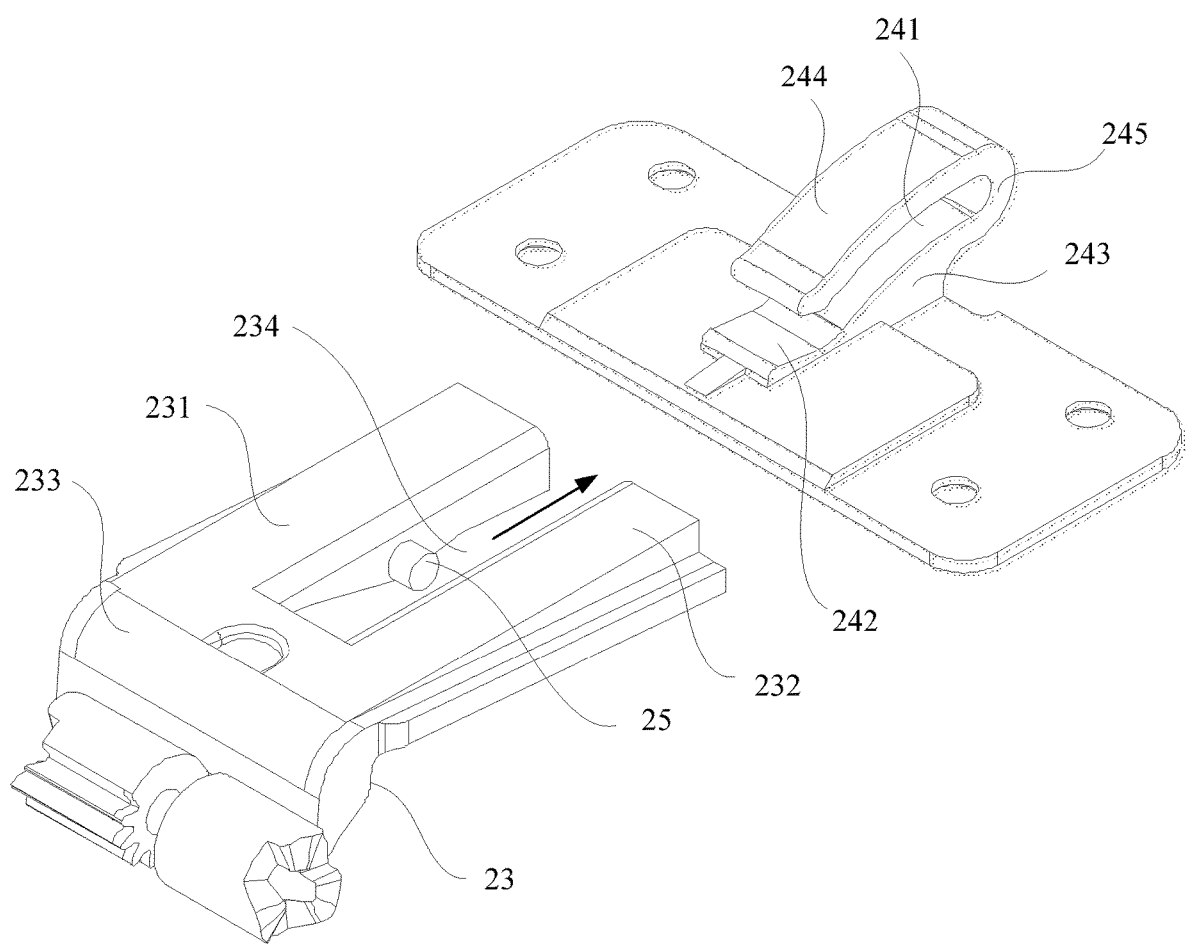
FIG. 5 illustrates a schematic diagram of an assembling process of a first swing arm with a sliding member provided by one or more examples of the present disclosure.

FIG. 5 illustrates a schematic diagram of an assembling process of a first swing arm with a sliding member provided by some examples of the present disclosure. As shown in FIG. 5, the guide member 25 is disposed in the mounting groove 234 and is connected to the first sliding rail 231. There is a gap or a distance between the guide member 25 and the second sliding rail 232.

In other examples, the guide member 25 may also be connected to the second sliding rail 232 with a gap or a distance between it and the first sliding rail 231.

Figure 6:
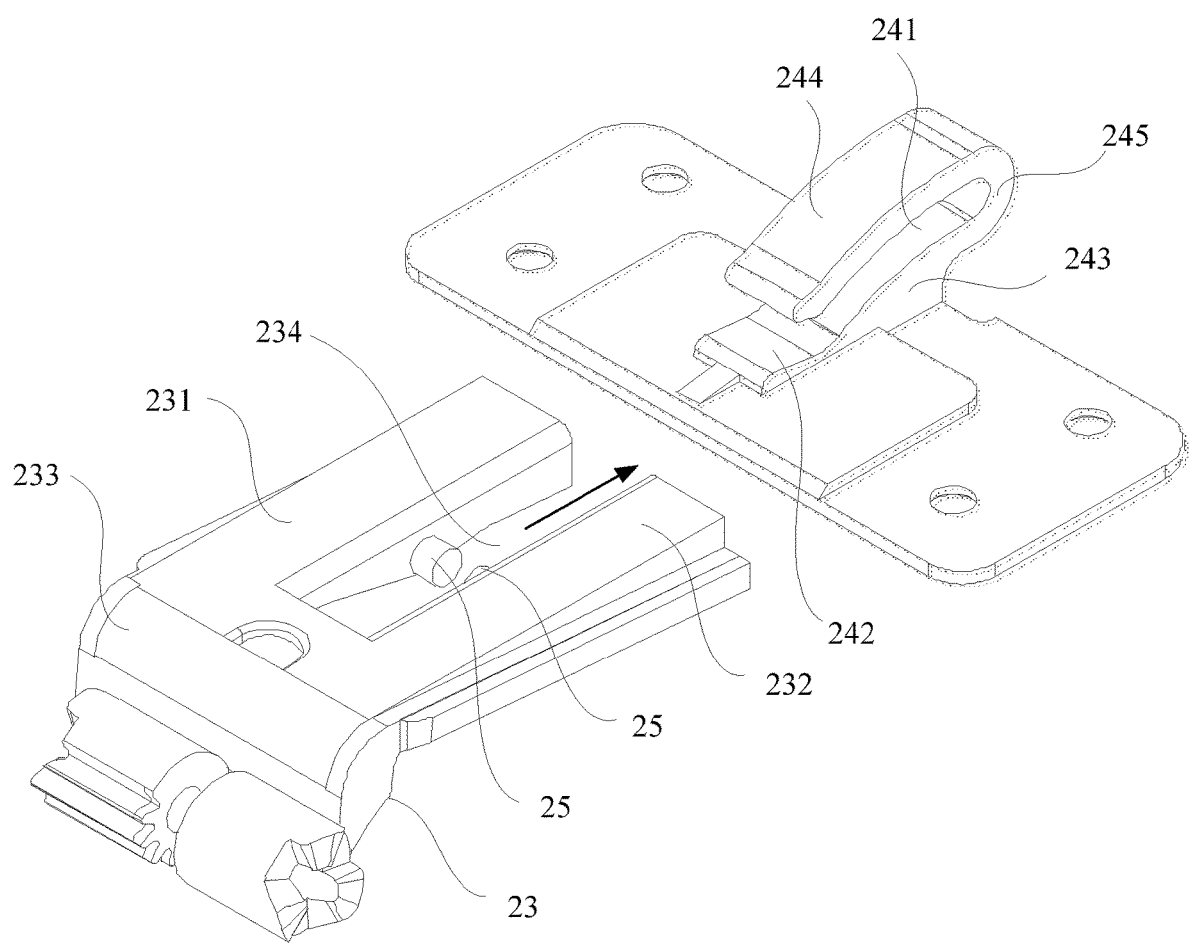
FIG. 6 illustrates a schematic diagram of an assembling process of a first swing arm with a sliding member provided by one or more examples of the present disclosure.

FIG. 6 illustrates a schematic diagram of an assembling process of a first swing arm with a sliding member provided by some examples of the present disclosure. As shown in FIG. 6, the bendable assembly 20 includes two guide members 25. One of the two guide members 25 is connected to the first sliding rail 231 and the other is connected to the second sliding rail 232. The two guide members 25 are arranged coaxially with a gap or a distance between the two guide members 25. The relative movement between the first swing arm 23 and the sliding member 24 is smoother by the two guide members 25 in conjunction with the sliding member 24.

Figure 7:
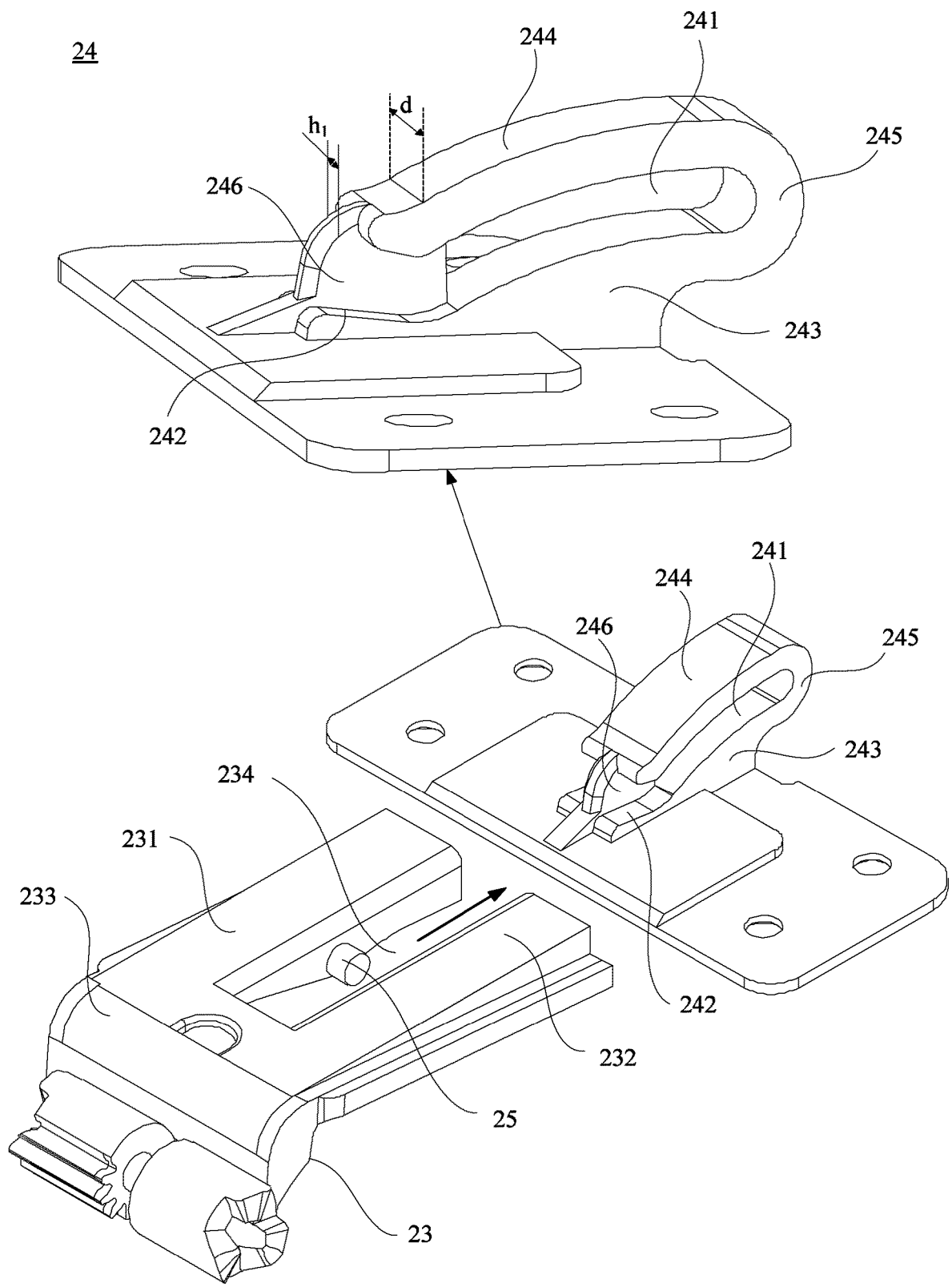
FIG. 7 illustrates a schematic diagram of an assembling process of a first swing arm with a sliding member provided by one or more examples of the present disclosure.

FIG. 7 illustrates a schematic diagram of an assembling process of a first swing arm with a sliding member provided by some examples of the present disclosure. As shown in FIG. 7, the sliding member 24 includes the mounting portion 243, the limiting portion 244, the first connecting portion 245, and a second connecting portion 246. The mounting portion 243 is connected to the support member 21, and the limiting portion 244 is located on a side of the mounting portion 243 away from the support member 21. The first connecting portion 245 is located on a side of the mounting portion 243 away from the hinge body 10, and is connected to the mounting portion 243 and the limiting portion 244, respectively. The second connecting portion 246 is located on a side of the mounting portion 243 close to the hinge body 10, and is connected to the mounting portion 243 and the limiting portion 244, respectively. The mounting portion 243, the limiting portion 244, the first connecting portion 245, and the second connecting portion 246 enclose the chute 241. A width $h_1$ of the second connecting portion 246, in a direction of a depth of the chute 241, is less than the depth d of the chute 241. By connecting the mounting portion 243 and the limiting portion 244 via the second connecting portion 246, the strength of the sliding member 24 can be increased and the deformation of the sliding member 24 can be avoided, contributing to the stability of the hinge.

As shown in FIG. 7, one end of the guide member 25 is connected to the first sliding rail 231, and is located on a side, in the direction of the depth of the chute 241, of the second connecting portion 246. By connecting one end of the guide member 25 to the first sliding rail 231, the guide member 25 can be slid into the chute 241 from the side of the second connecting portion 246 close to the first sliding rail 231 during assembly.

In other examples, the guide member 25 may also be connected to the second sliding rail 232 and there is a gap or a distance with the first sliding rail 231.

Figure 8:
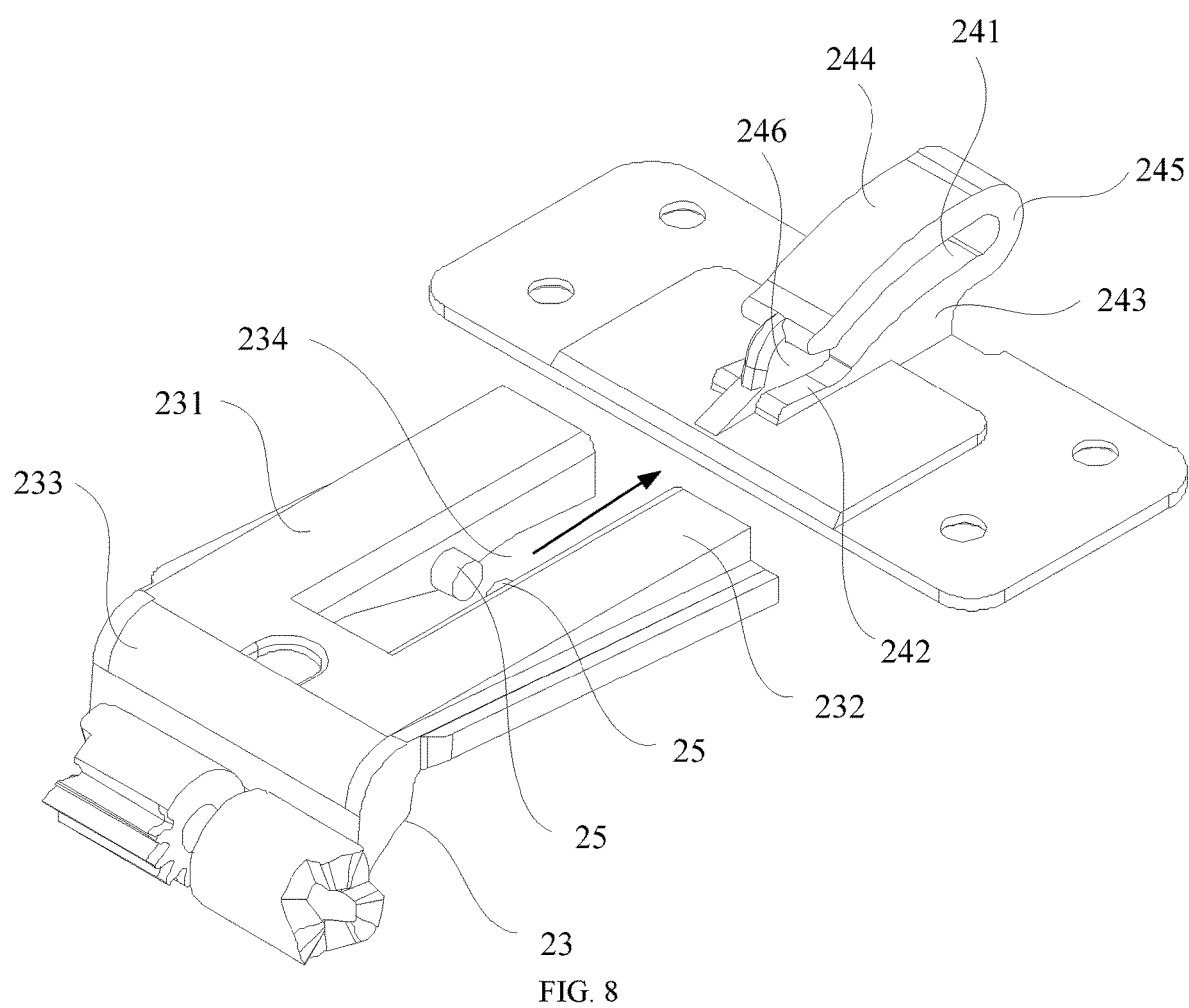
FIG. 8 illustrates a schematic diagram of an assembling process of a first swing arm with a sliding member provided by one or more examples of the present disclosure.

FIG. 8 illustrates a schematic diagram of an assembling process of a first swing arm with a sliding member provided by some examples of the present disclosure. As shown in FIG. 8, the bendable assembly 20 includes two guide members 25, one of the two guide members 25 is connected to the first sliding rail 231 and the other is connected to the second sliding rail 232. The two guide members 25 are arranged coaxially with a gap or a distance between the two guide members 25. By providing the two guide members 25, during assembly, the two guide members 25 may be slid into the chute 241 from respective sides of the second connecting portion 246. The two guide members 25 share the interaction force between the first swing arm 23 and the sliding member 24, so that the force on each guide member 25 is smaller, and the guide members 25 are less likely to deform or break, ensuring the stability of the overall structure.

Figure 9:
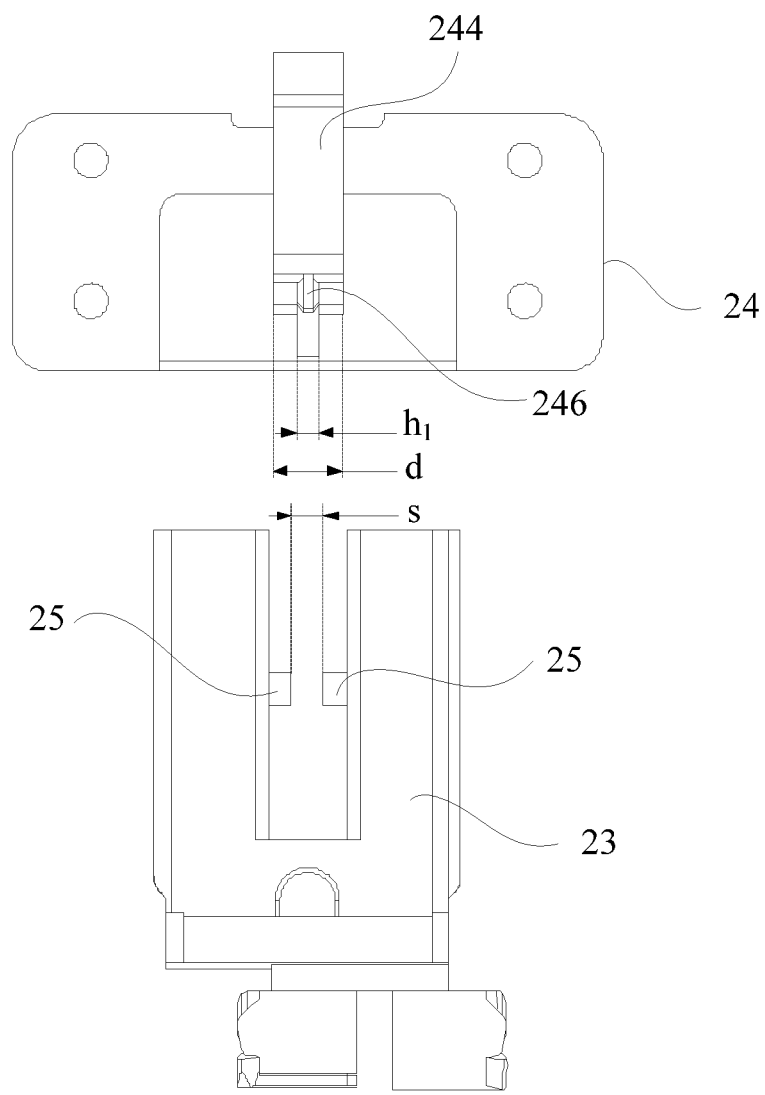
FIG. 9 illustrates a top view of FIG. 8.

FIG. 9 illustrates a top view of FIG. 8. As shown in FIG. 9, the gap or distance s between the two guide members 25 is greater than or equal to the width $h_1$, along the depth of the chute 241, of the second connecting portion 246, and less than the depth d of the chute 241 in order to allow the first swing arm 23 and the sliding member 24 to be assembled properly.

Figure 10:
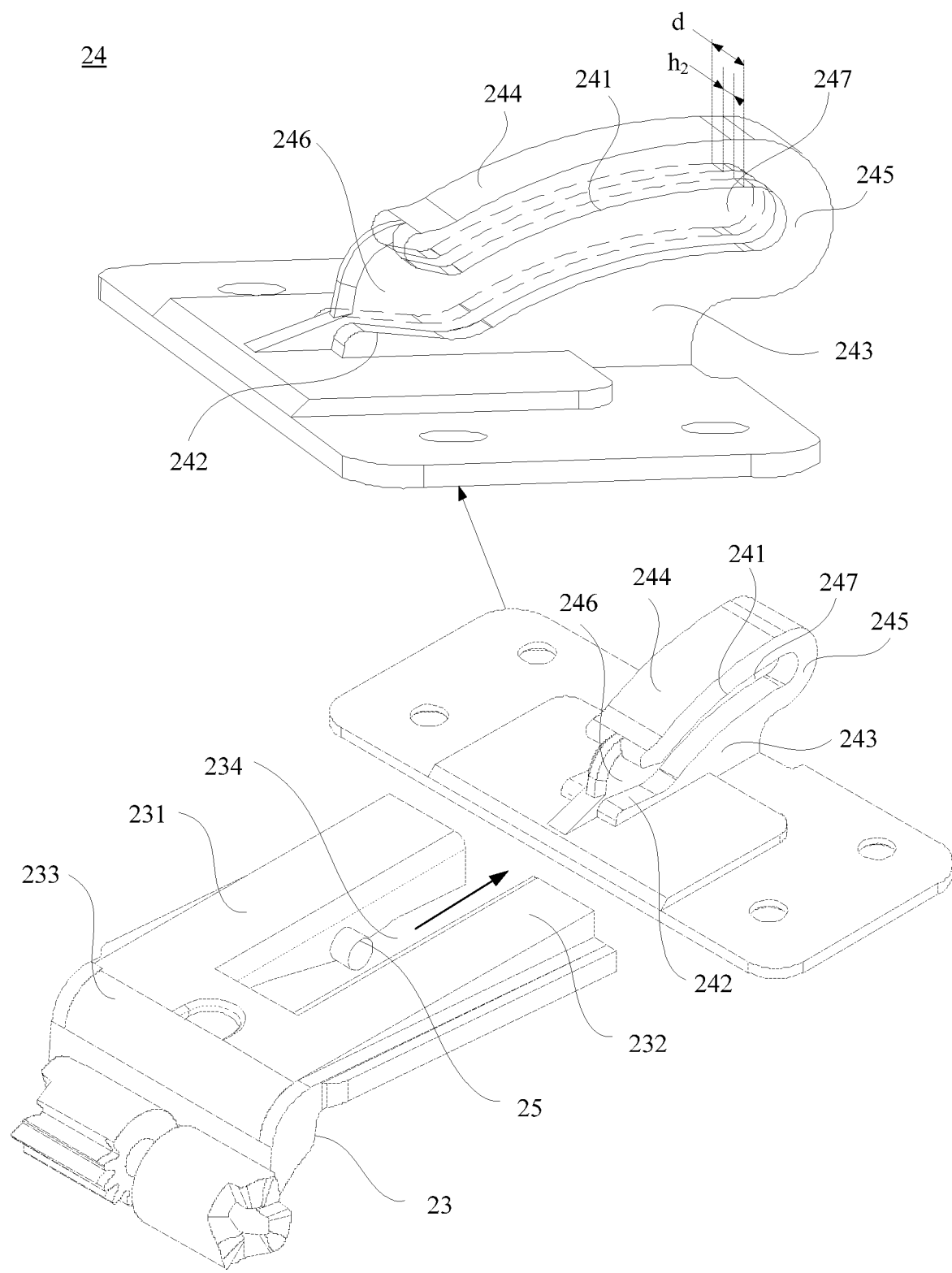
FIG. 10 illustrates a schematic diagram of an assembling process of a first swing arm with a sliding member provided by one or more examples of the present disclosure.

FIG. 10 illustrates a schematic diagram of an assembling process of a first swing arm with a sliding member provided by some examples of the present disclosure. As shown in FIG. 10, the sliding member 24 includes the mounting portion 243, the limiting portion 244, the first connecting portion 245, the second connecting portion 246, and an isolating portion 247. The mounting portion 243 is connected to the support member 21, and the limiting portion 244 is located on a side of the mounting portion 243 away from the support member 21. The first connecting portion 245 is located on the side of the mounting portion 243 away from the hinge body 10 and is connected to the mounting portion 243 and the limit portion 244, respectively. The second connecting portion 246 is located on a side of the mounting portion 243 close to the hinge body 10 and is connected to the mounting portion 243 and the limiting portion 244, respectively. The mounting portion 243, the limiting portion 244, the first connection portion 245 and the second connection portion 246 enclose the chute 241. The isolating portion 247 is disposed in the chute 241 and is connected to the inner wall of the chute 241. The width $h_2$, in the direction of the depth of the chute 241, of the isolating portion 247 is less than the depth d of the chute 241. The addition of the isolating portion 247 in the chute 241 further improves the strength of the sliding member 24, prevents the sliding member 24 from deforming and helps to improve the stability of the hinge.

As shown in FIG. 10, one end of the guide member 25 is connected to the first sliding rail 231, and the guide member 25 is located on one side of the isolating portion 247 in the depth direction of the chute 241. Thus, during assembly, the guide member 25 may be slid into the chute 241 from the side of the isolating portion 247 close to the first sliding rail 231.

In other examples, the guide member 25 may also be connected to the second sliding rail 232 and there is a gap or a distance between the guide member 25 and the first sliding rail 231.

Figure 11:
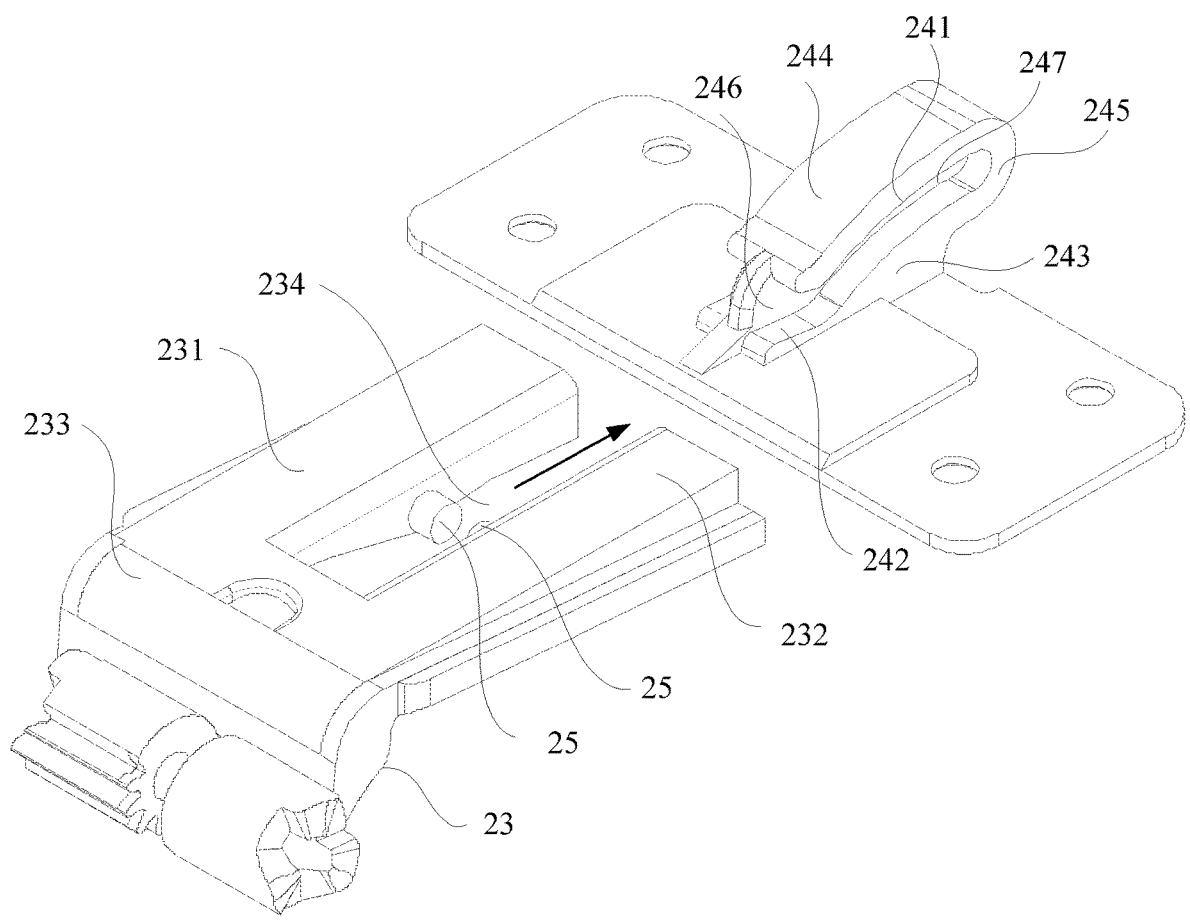
FIG. 11 illustrates a schematic diagram of an assembling process of a first swing arm with a sliding member provided by one or more examples of the present disclosure.

FIG. 11 illustrates a schematic diagram of an assembling process of a first swing arm with a sliding member provided by some examples of the present disclosure. As shown in FIG. 11, the bendable assembly 20 includes two guide members 25, one of the two guide members 25 is connected to the first sliding rail 231, the other is connected to the second sliding rail 232, and the two guide members 25 are arranged coaxially with a gap or a distance between the two guide members. By providing two guide members 25, during assembly, the two guide members 25 may be slid into the chute 241 from both sides of the second connecting portion 246, respectively. The two guide members 25 share the interaction force between the first swing arm 23 and the sliding member 24, so that the forces on each guide member 25 are small and the guide members 25 are not easily deformed or broken, ensuring the stability of the overall structure.

Figure 12:
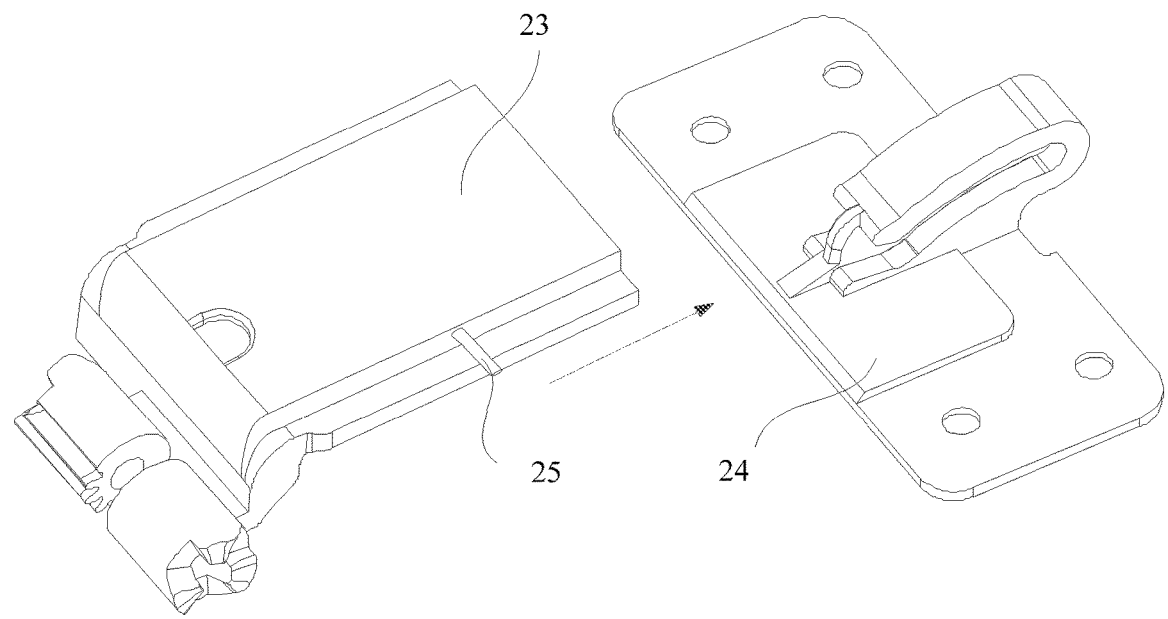
FIG. 12 illustrates a schematic diagram of an assembly process of a first swing arm with a sliding member provided by one or more examples of the present disclosure.

FIG. 12 illustrates a schematic diagram of an assembly process of a first swing arm with a sliding member provided by some examples of the present disclosure. As shown in FIG. 12, the sliding member 24 is located on one side of the first swing arm 23, the guide member 25 is located on the side of the first swing arm 23 close to the sliding member 24, and the guide member 25 is connected to the first swing arm 23. When the first swing arm 23 and the sliding member 24 are assembled, the guide member 25 is slid into the chute 241 through the gap 242. FIG. 12 shows an example where the structure of the sliding member 24 is the same as that of the sliding member 24 shown in FIG. 10. In other examples, the structure of the sliding member 24 shown in FIG. 12 may also be the same as that of the sliding member 24 shown in FIG. 4 or FIG. 7.

In some examples, the guide member 25 and the first swing arm 23 may be an integral structure, that is, the guide member 25 and the first swing arm 23 are integrally formed by injection molding or other processes. Since the sliding member 24 is provided with the gap 242, the guide member 25 can be slid into the chute 241 from the gap 242. Therefore, even before the assembly, the guide member 25 and the first swing arm 23 are connected as a whole without affecting the assembly. The guide member 25 and the first swing arm 23 are integrally formed, which is more convenient to manufacture. In addition, the guide member 25 and the first swing arm 23 can also be arranged independently and connected together by one or more connecting structures. The specific manner in which the guide member 25 is connected to the first swing arm 23 is not limited by the examples of the present disclosure.

In the examples of the present disclosure, integral molding includes, but is not limited to, casting, injection molding, and insert molding.

In some examples of the present disclosure, the guide member 25 and the first swing arm 23 are formed by casting. By using a metal material for the guide member 25 and the first swing arm 23, the guide 25 can be made to have a higher strength.

Figure 13:
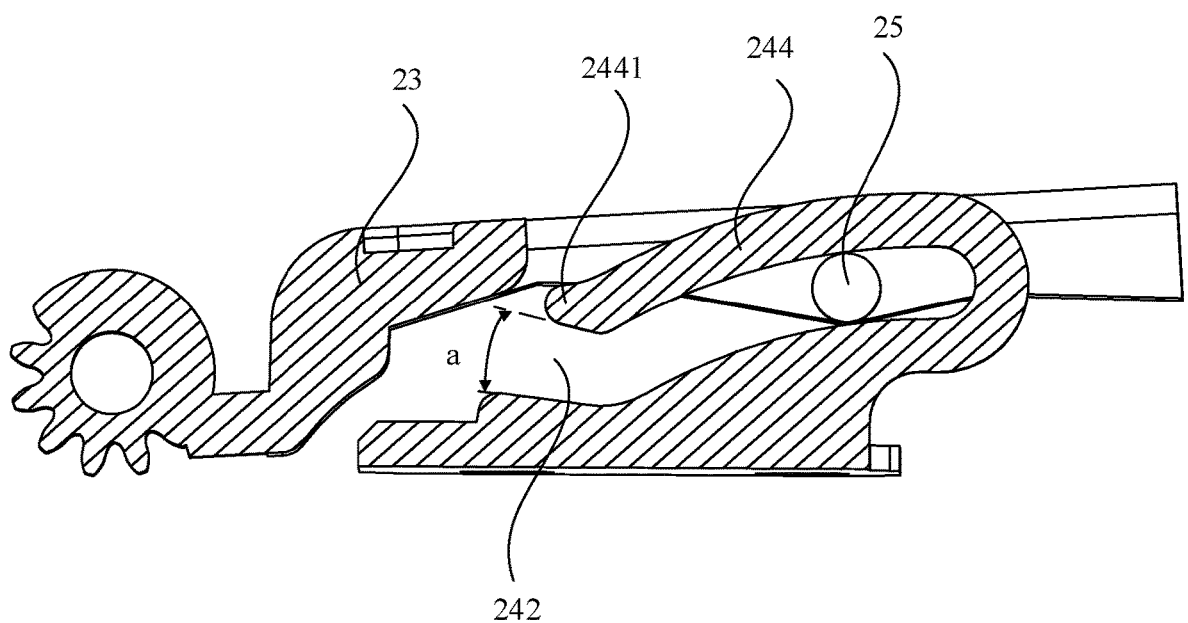
FIG. 13 illustrates a cross-sectional view of a bendable assembly provided by one or more examples of the present disclosure.

FIG. 13 illustrates a cross-sectional view of a bendable assembly provided by some examples of the present disclosure. As shown in FIG. 13, an angle a is formed between two side walls of the sliding member 24 at the gap 242, and an opening of the angle a is oriented towards the hinge body 10. A transition portion is provided at the gap 242 of the sliding member 24. By setting the angle of the opening towards the hinge body 10, it is easy for the guide member 25 to slide into the chute 241 through the gap 242. Furthermore, a transition portion 2441 is provided to guide the assembly of the guide member 25, reducing the difficulty during assembly.

Figure 14:
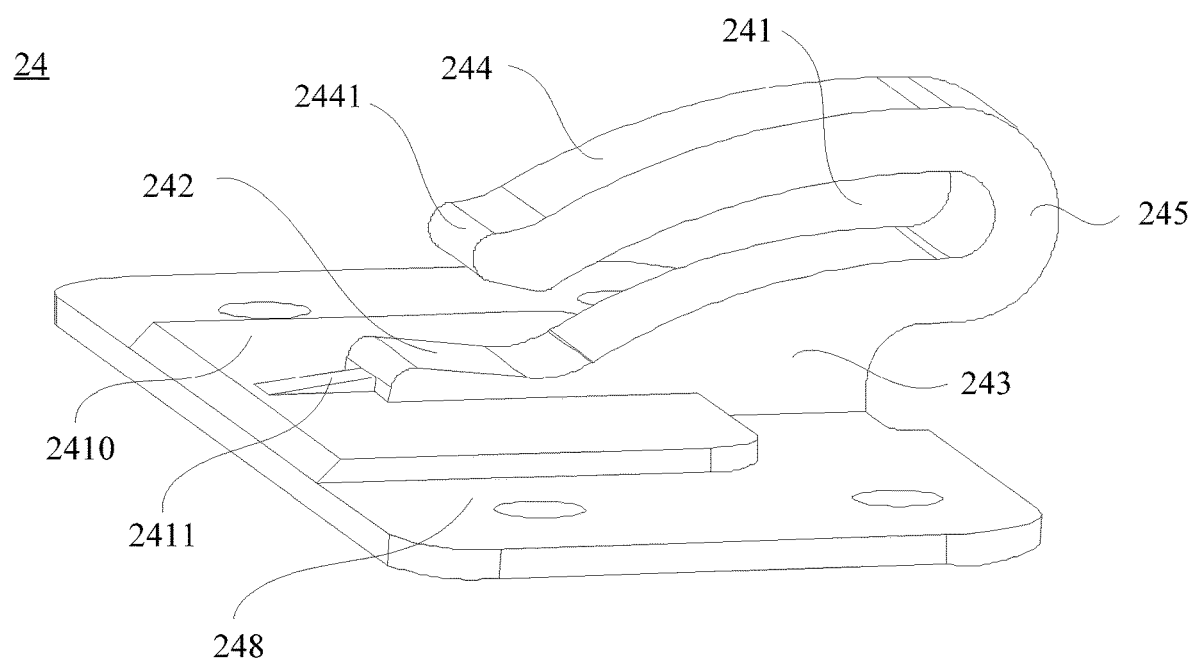
FIG. 14 illustrates a structural schematic diagram of a sliding member provided by one or more examples of the present disclosure.

FIG. 14 illustrates a structural schematic diagram of a sliding member provided by some examples of the present disclosure. As shown in FIG. 14, the sliding member 24 further includes a third connecting portion 248. The third connecting portion 248 is located on the side of the mounting portion 243 away from the limiting portion 244, connected to the mounting portion 243, and connected to the support member 21.

Figure 15:
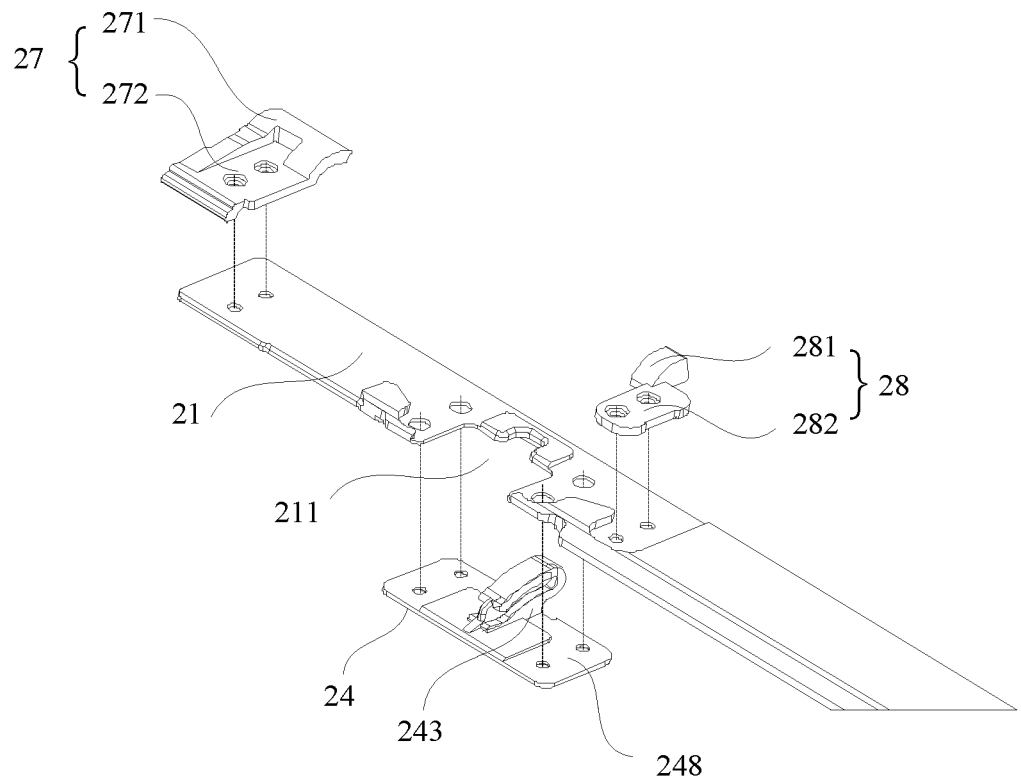
FIG. 15 illustrates a schematic diagram of an assembly process of a support member, connector members, and a sliding member provided by one or more examples of the present disclosure.
Figure 15:
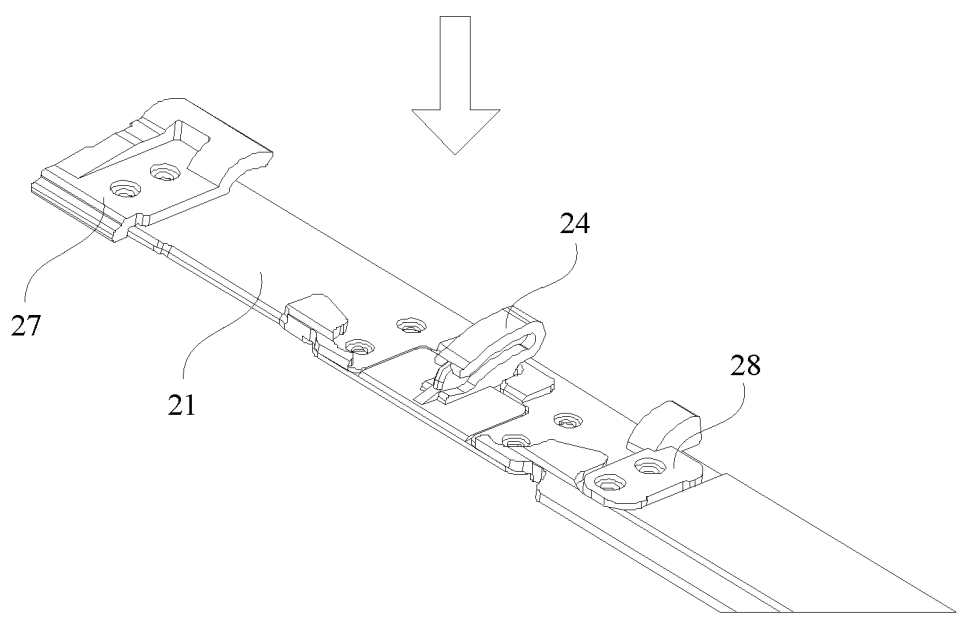

FIG. 15 illustrates a schematic diagram of an assembly process of a support member, connector members, and a sliding member provided by some examples of the present disclosure. As shown in FIG. 15, the support member 21 is provided with a receiving groove 211. The third connecting portion 248 is located in the receiving groove 211, and is connected to the support member 21. The connection between the third connecting portion 248 and the support member 21 includes, but is not limited to, riveting, screw connection and welding, that is, the third connecting portion is provided with mounting holes for riveting and screw connection.

It should be noted that the third connecting portion 248 may be in the form of a plate or block, etc. The third connecting portion 248 is used to carry and fix the sliding member 24.

In some examples, a side, close to the mounting portion 243, of the third connecting portion 248 is provided with a reinforcing portion. In order to increase the structural strength of the third connecting portion 248, the reinforcing portion is provided within the predetermined range of the mounting portion 243, which may be a reinforcing rib or step structure or the like, to increase the structural strength of the third connecting portion 248. In some examples, referring to FIG. 14, the reinforcing portion is a limit protrusion 2410 and/or a reinforcing rib 2411. It should be understood that a limit protrusion 2410 or a reinforcing rib 2411 may be provided on the third connecting portion 248 and at the mounting portion 243, further, it is also possible to provide both a limit protrusion 2410 and a reinforcing rib 2411 on the third connecting portion 248 and at the mounting portion 243. In some examples, referring to FIG. 14, the mounting portion 243 is partially located on a surface of the limit protrusion 2410 away from the third connecting portion 248. The surface of the limit protrusion 2410 away from the third connecting portion 248 is connected to the mounting portion 243 by the reinforcing rib 2411, which is located on the side of the mounting portion 243 close to the hinge body 10.

As shown in FIG. 15, a first connector 27 and a second connector 28 are located on a side of the support member 21 close to the middle frame connector 22, and are connected to the support member 21. The first connector 27 and the second connector 28 are respectively located on either side, in a direction of a length of the middle frame connector 22, of the middle frame connector 22, and are pivotally connected to the middle frame connector 22. The first connector 27 and the second connector 28 are used to connect the support member 21 and the middle frame connector 22, so that the support member 21 and the middle frame connector 22 can be rotated relative to each other.

As shown in FIG. 15, the first connector 27 includes a first arc-shaped arm 271 and a first fixing part 272, and an end of the first arc-shaped arm 271 is connected to the first fixing part 272. The first arc-shaped arm 271 is in rotatable connection with the middle frame connector 22, and the first fixing part 272 is fixedly connected to the support member 21. The connection of the first fixing part 272 to the support member 21 includes, but is not limited to, riveting, screw connection, and welding.

As shown in FIG. 15, the second connector 28 includes a second arc-shaped arm 281 and a second fixing part 282, and an end of the second arc-shaped arm 281 is connected to the second fixing part 282. The second arc-shaped arm 281 is in rotatable connection with the middle frame connector 22, and the second fixing part 282 is fixedly connected to the support member 21. The connection of the second fixing part 282 to the support member 21 includes, but is not limited to, riveting, screw connection, and welding.

Figure 16:
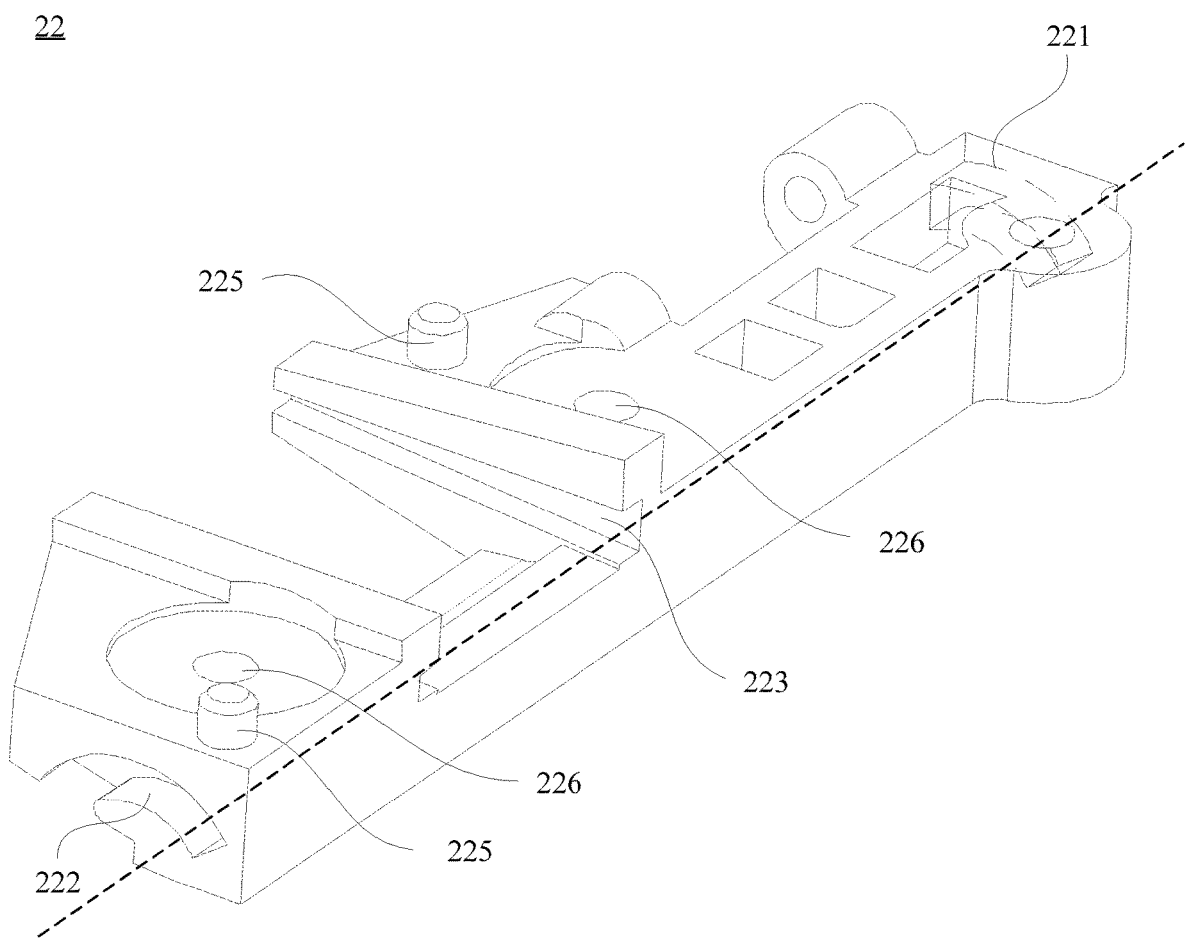
FIG. 16 illustrates a structural schematic diagram of a middle frame connector provided by one or more examples of the present disclosure.

FIG. 16 illustrates a structural schematic diagram of a middle frame connector provided by some examples of the present disclosure. As shown in FIG. 16, the middle frame connector 22 is provided with a first circular arc slot 221 and a second circular arc slot 222. The first circular arc slot 221 and the second circular arc slot 222 are located on either side, in the direction of the length of the middle frame connector 22, of the middle frame connector 22. The first arc-shaped arm 271 is located in the first circular arc slot 221 and is movable along the first circular arc slot 221. The second arc-shaped arm 281 is located in the second circular arc slot 222 and is movable along the second circular arc slot 222. The rotating connection of the first connector 27 and the second connector 28 to the middle frame connector 22 allows the support member 21 to be rotated relative to the middle frame connector 22.

As shown in FIG. 16, the dashed line indicates a line in which the axis of the first circular arc slot 221 and the axis of the second circular arc slot 222 are located, with the axes of the first circular arc slot 221 and the second circular arc slot 222 being co-linear. During rotation of the bendable assembly 20 around the hinge body 10, the support member 21 may be rotated around the collinear axis of the first circular arc slot 221 and the second circular arc slot 222.

In some examples, the middle frame connector 22 is further provided with a slideway 223, and the slideway 223 is located between the first circular arc slot 221 and the second circular arc slot 222. The first swing arm 23 is located in the slideway 223 and is slidable along the slideway 223. When the bendable assembly 20 is rotated around the hinge body 10, the first swing arm 23 slides along the slideway 223 relative to the middle frame connector 22.

As shown in FIG. 16, the middle frame connector 22 further includes middle frame positioning structures 225 and middle frame connecting structures 226. The middle frame positioning structures 225 and the middle frame connecting structures 226 are located on a surface, away from the support member 21, of the middle frame connector 22. The middle frame positioning structures 225 are located on either side of the slideway 23, and the middle frame connecting structures 226 are located on either side of the slideway 23. The middle frame positioning structure 225 may be a positioning post or a positioning hole, which enables the positioning of the middle frame connector 22 to the middle frame by cooperating with other positioning hole or other positioning post on the middle frame. The middle frame connecting structure 226 may be a threaded attachment structure or a snap to achieve a fixed connection between the middle frame connector 22 and the middle frame.

Referring to FIG. 3, the bendable assembly 20 further includes a second swing arm 26. The second swing arm 26 is located on a surface, close to the middle frame connector 22, of the support member 21 and is pivotally connected to the hinge body 10 and the middle frame connector 22 respectively. When the bendable assembly 20 is rotated around the hinge body 10, the second swing am 26 may be rotated around the hinge body 10, while the second swing arm 26 and the middle frame connector 22 are also rotated relative to each other.

Figure 17:
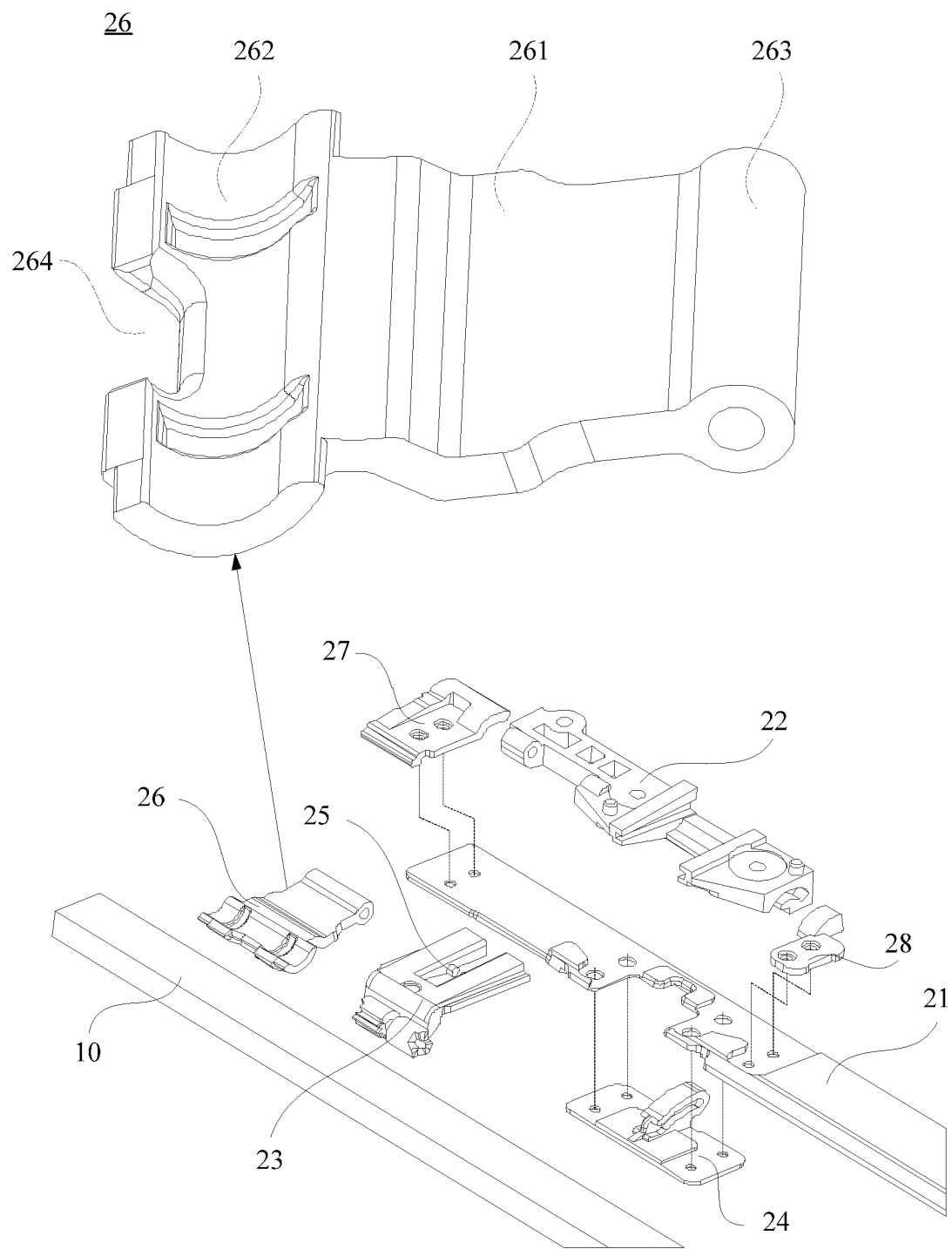
FIG. 17 illustrates a structural schematic diagram of a second swing arm provided by one or more examples of the present disclosure.

FIG. 17 illustrates a structural schematic diagram of a second swing arm provided by some examples of the present disclosure. As shown in FIG. 17, the second swing arm 26 includes a main body 261, a third arc-shaped arm 262 and a fourth connecting portion 263. The third arc-shaped arm 262 is located on one side of the main body 261, and one end of the third arc-shaped arm 262 is connected to the main body 261. The fourth connecting portion 263 is located on the other side of the main body 261 and is connected to the main body 261. The third arc-shaped arm 262 is in rotatable connection with the hinge body 10, and the axis of rotation is parallel but not coincident with the axis of rotation of the first swing arm 23 around the hinge body 10. The fourth connecting portion 263 is in rotatable connection with the middle frame connector 22. When the bendable assembly 20 is rotated around the hinge body 10, the second swing arm 26 and the hinge body 10 are rotated relative to each other, and the middle frame connector 22 and the second swing arm 26 are rotated relative to each other; and the first swing arm 23 and the hinge body 10 are rotated relative to each other, the middle frame connector 22 and the first swing arm 23 are slid relative to each other.

As shown in FIG. 17, one end, away from the main body 261), of the third arc-shaped arm 262 is provided with a groove 264. The groove 264 is used to avoid components in the hinge body 10 and facilitate assembly of the hinge body 10.

Figure 18:
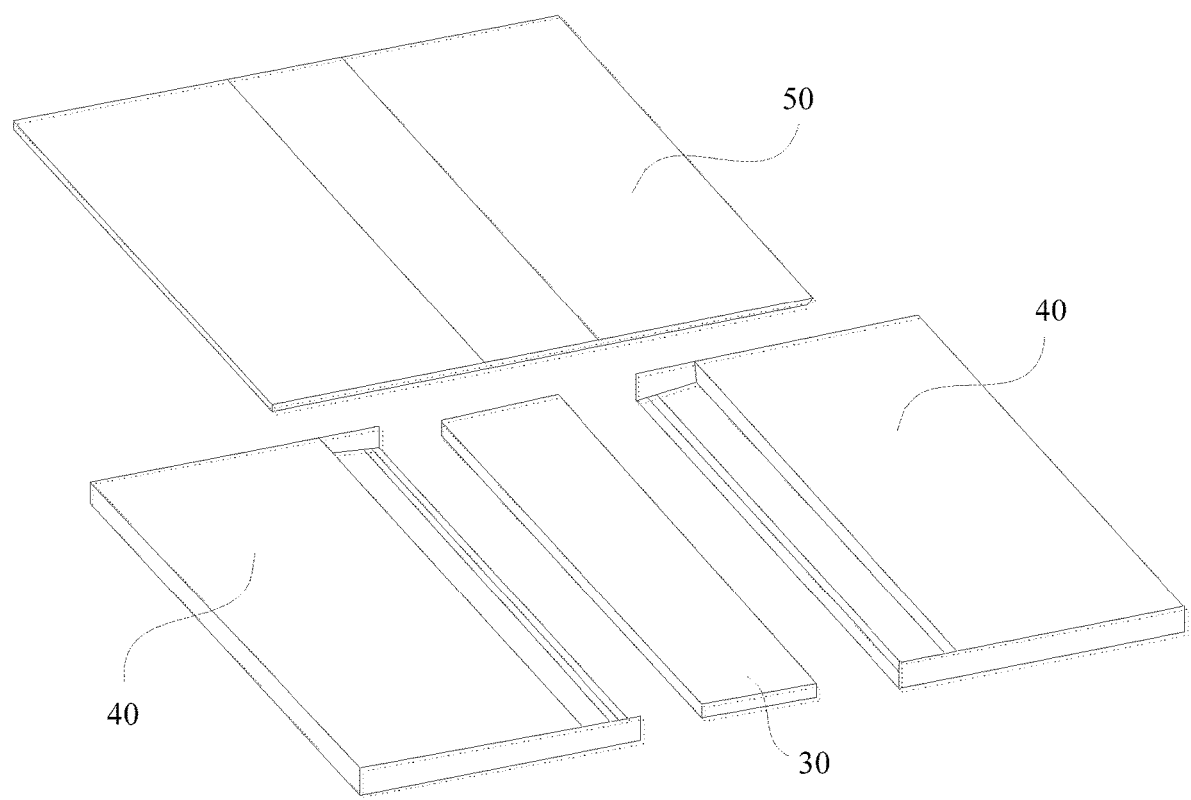
FIG. 18 illustrates a structural schematic diagram of a disassembly process of an electronic device provided by one or more examples of the present disclosure.

FIG. 18 illustrates a structural schematic diagram of a disassembly process of an electronic device provided by some examples of the present disclosure. As shown in FIG. 18, the electronic device includes two middle frames 40, a flexible screen 50 and a hinge 30. The two middle frames 40 are respectively connected to two bendable assemblies 20. The flexible screen 50 is connected to the two middle frames 40.

In some examples, the middle frame 40 is connected to the middle frame connector 22 by screw connection, welding, or bonding.

Figure 19:
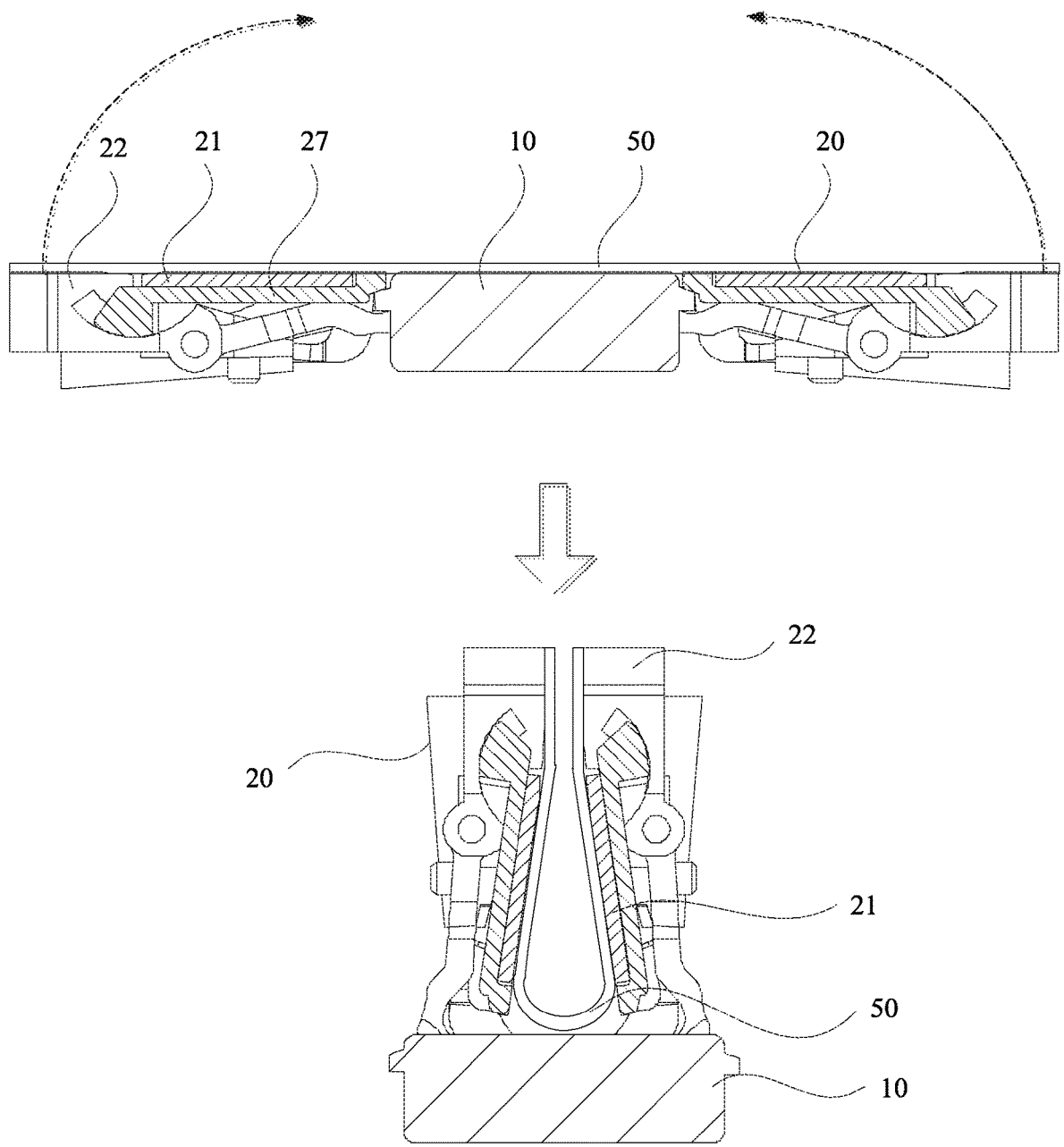
FIG. 19 illustrates a schematic diagram of a bending process of a hinge provided by one or more examples of the present disclosure.

FIG. 19 illustrates a schematic diagram of a bending process of a hinge provided by some examples of the present disclosure. As shown in FIG. 19, one end of the first connector 27 close to the hinge body 10 extends relative to the support member 21. When the hinge 30 is unfolded, the two support members 21 are coplanar on one surface close to the flexible screen 50, so that the flexible screen 50 remains flat. When the hinge is bent, the support member 21 will rotate relative to the middle frame connector 22, with an angle formed by the two support members 21, making the cross section of the flexible screen 50 in a teardrop shape after bending, avoiding the flexible screen 50 being bent at too large an angle and producing creases or damage.

The above description introduces only alternative examples of the present disclosure and is not intended to limit the present disclosure. Any modifications, equivalent substitutions, improvements, etc., made within the spirit and principles of the present disclosure shall be included within the scope of protection of the present disclosure.

What is claimed is:

1. A hinge, comprising:
a hinge body; and
a bendable assembly that comprises: a first swing arm, a sliding member, and a guide member, a support member and a middle frame connector, the bendable assembly being movably connected with one side of the hinge body,
wherein the first swing arm is movably connected with the hinge body, the first swing arm is in a slip connection with the sliding member, and the first swing arm is in a slip connection with the middle frame connector,
wherein a side wall of the sliding member is provided with a chute, and an end of the chute that is close to the hinge body comprises a gap, and
wherein the guide member is connected to the first swing arm and is configured to be engaged with or exited from the chute through the gap to achieve the slip connection between the first swing arm and the sliding member;
wherein the support member is connected to the sliding member, the middle frame connector, the first swing arm, the guide member and the sliding member are disposed on a same surface of the support member, and the middle frame connector is pivotally connected to the support member, and the first swing arm is pivotally connected to the hinge body; and
wherein the sliding member comprises a mounting portion, a limiting portion, a first connecting portion, and a second connecting portion; and wherein
the mounting portion is connected to the support member, the limiting portion is disposed on a side of the mounting portion that is away from the support member, the first connecting portion is disposed on a side of the mounting portion that is away from the hinge body, and is connected to the mounting portion and the limiting portion, and the mounting portion, the limiting portion and the first connecting portion enclose the chute; and
the second connecting portion is disposed on a side, close to the hinge body, of the mounting portion, and is connected to the mounting portion and the limiting portion, and a width of the second connecting portion, in a direction of a depth of the chute, is less than the depth of the chute; and an end of the guide member is connected to the first swing arm, and the guide member is disposed on a side, in the direction of the depth of the chute, of the second connecting portion.

2. The hinge of claim 1, wherein the sliding member further comprises an isolating portion, the isolating portion being disposed in the chute and being connected to an inner wall of the chute; and wherein
an end of the guide member is connected to the first swing arm, and the guide member is disposed on a side, in the direction of the depth of the chute, of the isolating portion.

3. The hinge of claim 1, wherein
an angle is formed between two side walls of the sliding member at the gap, and an opening of the angle is oriented towards the hinge body; and
a transition portion is provided at the gap of the sliding member.

4. The hinge of claim 1, wherein the sliding member further comprises a third connecting portion, the third connecting portion being disposed on a side, away from the limiting portion, of the mounting portion, being connected to the mounting portion, and being connected to the support member.

5. The hinge of claim 4, wherein a side, close to the mounting portion, of the third connecting portion is provided with a reinforcing portion.

6. The hinge of claim 1, wherein the first swing arm comprises a first sliding rail, a second sliding rail and a rotating part; wherein
the first sliding rail and the second sliding rail are disposed on a same side of the rotating part, and are respectively connected to the rotating part,
the rotating part is hinged to the hinge body, and
the first sliding rail, the second sliding rail and the rotating part enclose a mounting groove; and wherein
the guide member and the sliding member are disposed in the mounting groove.

7. The hinge of claim 6, wherein
two ends of the guide member are respectively connected to the first sliding rail and the second sliding rail; or
the guide member is connected to the first sliding rail; or
the guide member is connected to the second sliding rail.

8. The hinge of claim 6, wherein the bendable assembly further comprises another guide member; and wherein
one of the two guide members is connected to the first sliding rail,
the other one of the two guide members is connected to the second sliding rail; and
the two guide members are arranged coaxially with a distance between the two guide members.

9. The hinge of claim 1, wherein
the sliding member is disposed on a side of the first swing arm, and
the guide member is disposed on a side, close to the sliding member, of the first swing arm, and is connected to the first swing arm.

10. The hinge of claim 1, wherein the bendable assembly further comprises a first connector and a second connector; and wherein
the first connector and the second connector are disposed on a surface, close to the middle frame connector, of the support member and are connected to the support member,
in a direction of a length of the middle frame connector, the first connector and the second connector are disposed on either side of the middle frame connector, and are pivotally connected to the middle frame connector.

11. The hinge of claim 10, wherein the first connector comprises a first arc-shaped arm and a first fixing part; and wherein
an end of the first arc-shaped arm is connected to the first fixing part,
the first arc-shaped arm is rotatably connected with the middle frame connector, and
the first fixing part is fixedly connected to the support member;
wherein the second connector comprises a second arc-shaped arm and a second fixing part; and wherein
an end of the second arc-shaped arm is connected to the second fixing part,
the second arc-shaped arm is rotatably connected with the middle frame connector, and
the second fixing part is fixedly connected to the support member.

12. The hinge of claim 11, wherein the middle frame connector comprises a first circular arc slot and a second circular arc slot, the first circular arc slot and the second circular arc slot being located on either side, in the direction of the length of the middle frame connector, of the middle frame connector; and wherein the first arc-shaped arm is located in the first circular arc slot and is movable along the first circular arc slot, and the second arc-shaped arm is located in the second circular arc slot and is movable along the second circular arc slot.

13. The hinge of claim 12, wherein the middle frame connector is further provided with a slideway, the slideway being located between the first circular arc slot and the second circular arc slot; and wherein the first swing arm is located in the slideway and is slidable along the slideway.

14. The hinge of claim 13, wherein the middle frame connector further comprises middle frame positioning structures and middle frame connecting structures; and wherein the middle frame positioning structures and the middle frame connecting structures are disposed on a surface, away from the support member, of the middle frame connector, the middle frame positioning structures are disposed on either side of the slideway, and the middle frame connecting structures are disposed on either side of the slideway.

15. The hinge of claim 1, wherein the bendable assembly further comprises a second swing arm, the second swing arm being located on a surface, close to the middle frame connector, of the support member and being pivotally connected to the hinge body and the middle frame connector.

16. The hinge of claim 15, wherein the second swing arm comprises a main body, a third arc-shaped arm and a fourth connecting portion; and wherein the third arc-shaped arm is disposed on one side of the main body, one end of the third arc-shaped arm is connected to the main body, and the third arc-shaped arm is in rotatably connected with the hinge body, wherein one end, away from the main body, of the third arc-shaped arm is provided with a groove, and the fourth connecting portion is located on the other side of the main body and is connected to the main body, and the fourth connecting portion is in rotatable connection with the middle frame connector.

17. An electronic device, comprising: two middle frames, a flexible screen, and a hinge, wherein the hinge comprises a hinge body and two bendable assemblies being movably connected on two opposite sides of the hinge body; and one of the two bendable assemblies comprises: a first swing arm, a sliding member and a guide member, a support member and a middle frame connector, wherein the first swing arm is movably connected with the hinge body, the first swing arm is in a slip connection with the sliding member, and the first swing arm is in a slip connection with the middle frame connector, a side wall of the sliding member is provided with a chute, and an end of the chute that is close to the hinge body comprises a gap, and the guide member is connected to the first swing arm and is configured to be engaged with or exited from the chute through the gap to achieve the slip connection between the first swing arm and the sliding member;

the support member is connected to the sliding member, the middle frame connector, the first swing arm, the guide member and the sliding member are disposed on a same surface of the support member, and the middle frame connector is pivotally connected to the support member, and the first swing arm is pivotally connected to the hinge body; and the sliding member comprises a mounting portion, a limiting portion, a first connecting portion, and a second connecting portion; and wherein the mounting portion is connected to the support member, the limiting portion is disposed on a side of the mounting portion that is away from the support member, the first connecting portion is disposed on a side of the mounting portion that is away from the hinge body, and is connected to the mounting portion and the limiting portion, and the mounting portion, the limiting portion and the first connecting portion enclose the chute; and the second connecting portion is disposed on a side, close to the hinge body, of the mounting portion, and is connected to the mounting portion and the limiting portion, and a width of the second connecting portion, in a direction of a depth of the chute, is less than the depth of the chute; and an end of the guide member is connected to the first swing arm, and the guide member is disposed on a side, in the direction of the depth of the chute, of the second connecting portion;

the two middle frames are respectively connected to the two bendable assemblies, and the flexible screen is connected to the two middle frames.

\* \* \* \* \*